(12) United States Patent
Yu

(10) Patent No.: US 12,287,672 B1
(45) Date of Patent: Apr. 29, 2025

(54) EXTENDED SCREEN

(71) Applicant: Liling Yu, Xinyi (CN)

(72) Inventor: Liling Yu, Xinyi (CN)

(*) Notice: Subject to any disclaimer, the term of this patent is extended or adjusted under 35 U.S.C. 154(b) by 0 days.

(21) Appl. No.: 18/900,404

(22) Filed: Sep. 27, 2024

(30) Foreign Application Priority Data

Sep. 18, 2024 (CN) .......................... 202422278127.1

(51) Int. Cl.
*G06F 1/16* (2006.01)

(52) U.S. Cl.
CPC ............ *G06F 1/1647* (2013.01); *G06F 1/166* (2013.01)

(58) Field of Classification Search
CPC ....... G06F 1/1647; G06F 1/1649; G06F 1/165
See application file for complete search history.

(56) References Cited

U.S. PATENT DOCUMENTS

| | | | | |
|---|---|---|---|---|
| 6,643,124 B1* | 11/2003 | Wilk | .................. | H04M 1/0247 345/169 |
| 8,508,938 B2* | 8/2013 | Luo | ........................ | G06F 1/166 345/169 |
| 8,539,705 B2* | 9/2013 | Bullister | ............... | G06F 1/1615 361/679.04 |
| 2012/0256929 A1* | 10/2012 | Koenig | .................... | G09G 5/00 345/503 |
| 2014/0375530 A1* | 12/2014 | Delaporte | ............. | G06F 1/1652 345/1.3 |
| 2015/0335158 A1* | 11/2015 | Grosswiller | ........... | A47B 97/00 211/26 |

OTHER PUBLICATIONS

Uperfect Portable Monitor 18.5 inch [online]. Uperfect, 2020. Retrieved from the internet: <https://www.amazon.com/UPERFECT-Adjustable-Ultra-Slim-Lightweight-Frameless/dp/B08L5SRCZJ/ref=sr_1_5?crid=2SMQ30XJORUZH&dib=eyJ2ljoiMSJ9.7ENpeY-_VJcD9k2XsDdKvuR4cD1JRSv6SohJesc2d0IDtlcMSxoSDU0_tRBsNe1aihwL>. (Year: 2020).*

\* cited by examiner

*Primary Examiner* — James Wu

(57) ABSTRACT

An extended screen includes a first display screen, a second display screen, and a third display screen. The second display screen is connected to a top end of the first display screen. The third display screen is connected to a left side edge or a right side edge of the second display screen, so that the first display screen and the third display screen are capable of forming a diagonal shape. When the first display screen and the third display screen form a diagonal shape, one placement position is formed below the third display screen near the first display screen. The placement position is configured for placing a display screen of a computer device. The extended screen includes three display screens, with two display screens arranged transversely above and one display screen arranged below, forming one placement position for placing the display screen of the computer device.

19 Claims, 13 Drawing Sheets

EXTENDED SCREEN

CROSS-REFERENCE TO RELATED APPLICATIONS

The application claims priority of Chinese patent application 202422278127.1, filed on 2024 Sep. 18, which is incorporated herein by reference in its entireties.

TECHNICAL FIELD

The present invention relates to an extended screen applied in the technical field of computer accessories.

BACKGROUND ART

In the prior art, computers have become an essential item in people's lives, and with the growth of people's demand, extended screens have also come into being. In the past terminal products such as laptops and desktop displays, the size of the screen has been determined during the production process, but in practical applications, it is difficult to meet consumers' needs for multiple screens or large screens. Therefore, in order to meet the needs of consumers, split-screen display technology is usually used to achieve multi-screen display effect.

However, the existing extended screens are basically clamped on a display screen of a computer device. In order to make the display screen present images more widely, the top, left, and right sides of the display screen of the computer device are usually each installed with a separate extended screen. However, in terms of this installation method, firstly, due to the weight of the three separate extended screens being too heavy, the display screen of the computer device will be easily damaged; secondly, this installation method makes an overall shape equivalent to an inverted capital "T" shape, which is not convenient for a user to watch; thirdly, it is inconvenient to carry a plurality of separate extended screens; fourthly, installing two extended screens transversely on the display screen of the computer device takes up a lot of space, which causes inconvenience to the user.

SUMMARY

Extended screens in the prior art are basically clamped on a display screen of a computer device, and to make the display screen present images more widely, the top, left, and right sides of the display screen of the computer device are usually each installed with a separate extended screen, but this installation method is inconvenient for a user to use and watch. In order to solve the problems mentioned above, an extended screen is provided in the present invention. The extended screen includes three display screens, with two display screens arranged transversely above and one display screen arranged below, forming one placement position for placing the display screen of the computer device. Therefore, four display screens are gathered to make it more convenient for the user to view and use.

The technical solution adopted by the present invention to solve its technical problems is as follows. An extended screen is provided. The extended screen includes a first display screen, a second display screen, and a third display screen. The second display screen is connected to a top end of the first display screen, and the third display screen is connected to a left side edge or a right side edge of the second display screen, so that the first display screen and the third display screen are capable of forming a diagonal shape.

When the first display screen and the third display screen form a diagonal shape, one placement position is formed below the third display screen near the first display screen. The placement position is configured for placing a display screen of a computer device.

Furthermore, both the first display screen and the third display screen are rotatably connected to the second display screen, and the first display screen and the third display screen are capable of being rotated to be stacked on the second display screen.

Furthermore, the extended screen further includes first rotating connecting members. One end of the first rotating connecting member is fixedly connected to the second display screen. The first rotating connecting member is rotatably arranged at the top end of the first display screen, and a display surface of the first display screen is capable of rotating to abut against a display surface of the second display screen through the rotation of the first rotating connecting member. The first display screen is capable of rotating at least 180 degrees relative to the second display screen through the first rotating connecting member.

Furthermore, the first rotating connecting member includes a first connecting plate and a first connecting shaft cylinder. The first connecting plate is arranged on a side surface of the first connecting shaft cylinder, and the first connecting shaft cylinder is connected to a first connecting part on the first display screen through damping rotation. The first connecting plate is fixedly connected to the second display screen through a fixing member. Moreover, when the first display screen is unfolded at a maximum angle relative to the second display screen, a side edge of the second display screen connected to the first display screen is positioned on a back surface of the first display screen.

Furthermore, an installation notch is defined on a side edge of the first display screen near the second display screen, and a cover plate is provided on the display surface of the second display screen near the first display screen. When the first display screen is connected to the second display screen, the cover plate is arranged at the installation notch. One side wall of the installation notch is provided with a first wire passing hole. One end of the cover plate near the first wire passing hole is provided with a second wire passing hole, and an inside of the cover plate is in communication with an inside of the second display screen.

Furthermore, the extended screen further includes second rotating connecting members. One end of the second rotating connecting member is fixedly connected to the third display screen. The second rotating connecting member is rotatably arranged on the left side edge or the right side edge of the second display screen, and a back surface of the third display screen is capable of being rotated to abut against the back surface of the second display screen through the rotation of the second rotating connecting member. The third display screen is capable of rotating at least 180 degrees relative to the second display screen through the second rotating connecting member.

Furthermore, the second rotating connecting member includes a second connecting plate and a second connecting shaft cylinder. The second connecting plate is arranged on a side surface of the second connecting shaft cylinder. The second connecting shaft cylinder is connected to a second connecting part on the second display screen through damping rotation. The second connecting plate is fixedly connected to the third display screen through a fixing member. When the third display screen is unfolded at a maximum angle relative to the second display screen, a side edge of the third display screen connected to the second display screen is positioned on the back surface of the second display screen.

Furthermore, the extended screen further includes a support bracket. The support bracket is rotatably arranged on the first display screen.

Furthermore, the extended screen further includes two third rotating connecting members. The support bracket is a U-shaped support bracket, and the two third rotating connecting members are rotatably arranged on a back surface of the first display screen. One of the third rotating connecting members is arranged near a first side edge of the first display screen, and an opposite one of the third rotating connecting members is arranged near a second side edge of the first display screen. The first side edge of the first display screen is opposite to the second side edge of the first display screen, and two ends of the U-shaped support bracket are connected to the third rotating connecting members.

Furthermore, a support cross bar of the U-shaped support bracket is equipped with foot pads.

Furthermore, the support cross bar of the U-shaped support bracket is provided with foot pad installation positions. The foot pad is detachably installed at the foot pad installation position. When the foot pad is installed at the foot pad installation position, an outer side surface of the foot pad protrudes from an outer side surface of the support bracket.

Furthermore, the foot pad installation position is provided with clamping holes and openings. The opening is defined in an outer side surface of the support cross bar, and the clamping hole is in communication with the opening. The foot pad includes a housing and clamping columns. The housing includes one U-shaped installation groove. The housing is capable of being inserted into the foot pad installation position through the U-shaped installation groove. The clamping column is longitudinally arranged in the U-shaped installation groove, and the clamping column is capable of passing through the opening to be clamped into the clamping hole.

Furthermore, a connecting through-hole is defined between the opening and the clamping hole. A transverse diameter of the connecting through-hole is smaller than a transverse diameter of the clamping hole and a transverse diameter of the opening.

Furthermore, two side surfaces of the connecting through-hole are arc-shaped surfaces.

Furthermore, the foot pad installation position is provided with three of the clamping holes and three of the openings, and the foot pad is provided with three of the clamping columns.

Furthermore, the extended screen further includes a connecting interface. A first groove is defined in a side edge of the first display screen, the second display screen, or the third display screen. The connecting interface is provided inside the first groove.

Furthermore, the connecting interface is arranged on a side edge of the first display screen near the third display screen.

Furthermore, a first blocking plate is provided on one side of the first groove near the display surface of the first display screen, the display surface of the second display screen, or a display surface of the third display screen. The first blocking plate is arranged along a length of the first groove.

Furthermore, the extended screen further includes a display screen control key. A second groove is defined in a side edge of the first display screen, the second display screen, or the third display screen. The second groove is defined in an opposite side edge of the side edge in which the first groove is defined. The display screen control key is provided in the second groove.

Furthermore, a second blocking plate is provided on one side of the second groove near the display surface of the first display screen, the display surface of the second display screen, or the display surface of the third display screen. The second blocking plate is arranged along a length of the second groove, and a top end of the display screen control key does not exceed an outermost side edge of the second blocking plate.

Beneficial effects of the present invention are as follows. The extended screen is provided. The extended screen includes three display screens, with two display screens arranged transversely above and one display screen arranged below, forming one placement position for placing the display screen of the computer device. Therefore, four display screens are gathered to make it more convenient for the user to view and use. Both the first display screen and the third display screen are rotatably connected to the second display screen, so that the extended screen is capable of being folded for convenient carrying and use by the user.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
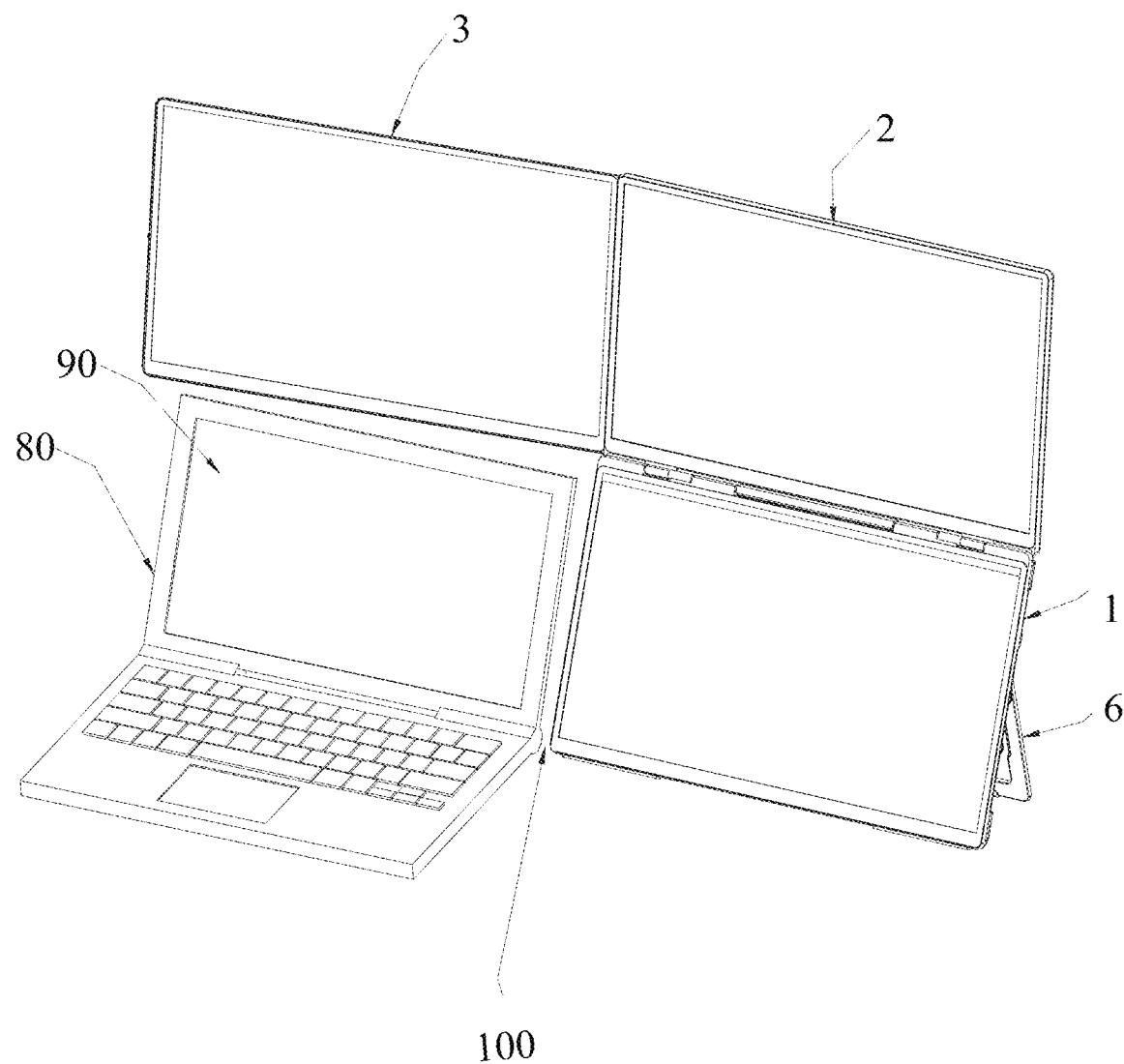
FIG. 1 is a perspective view of an extended screen with three screens unfolded according to the present invention.
Figure 2:
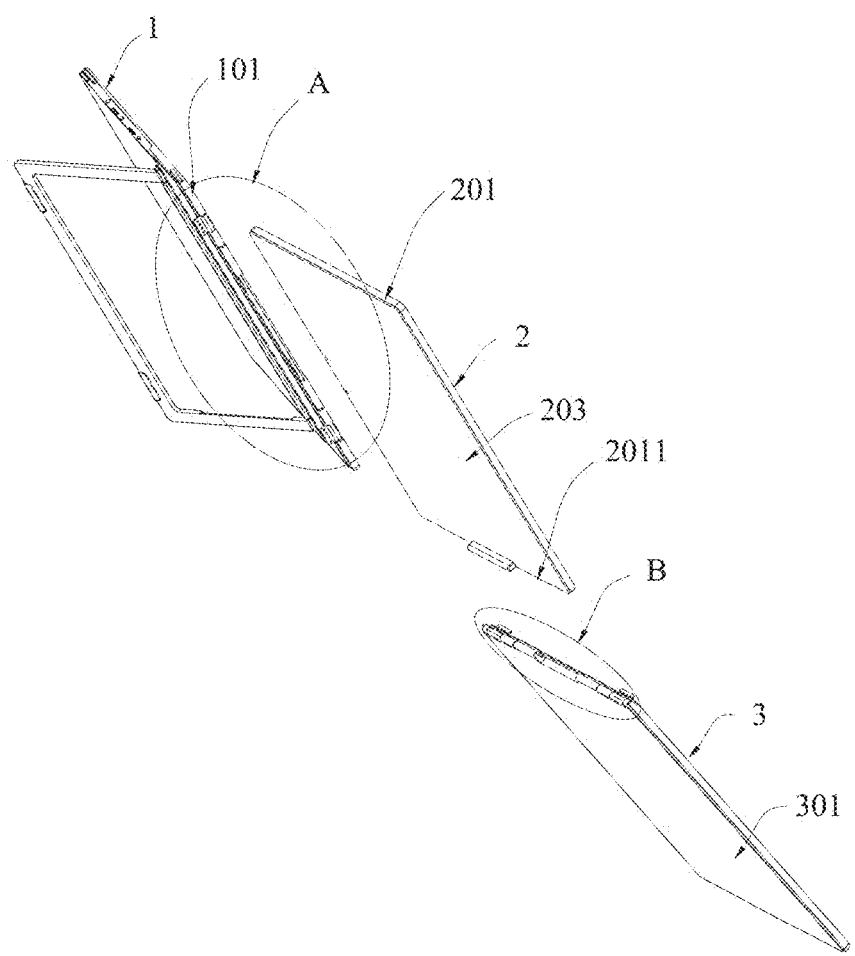
FIG. 2 is an exploded view of an extended screen with three screens unfolded according to the present invention.
Figure 3:
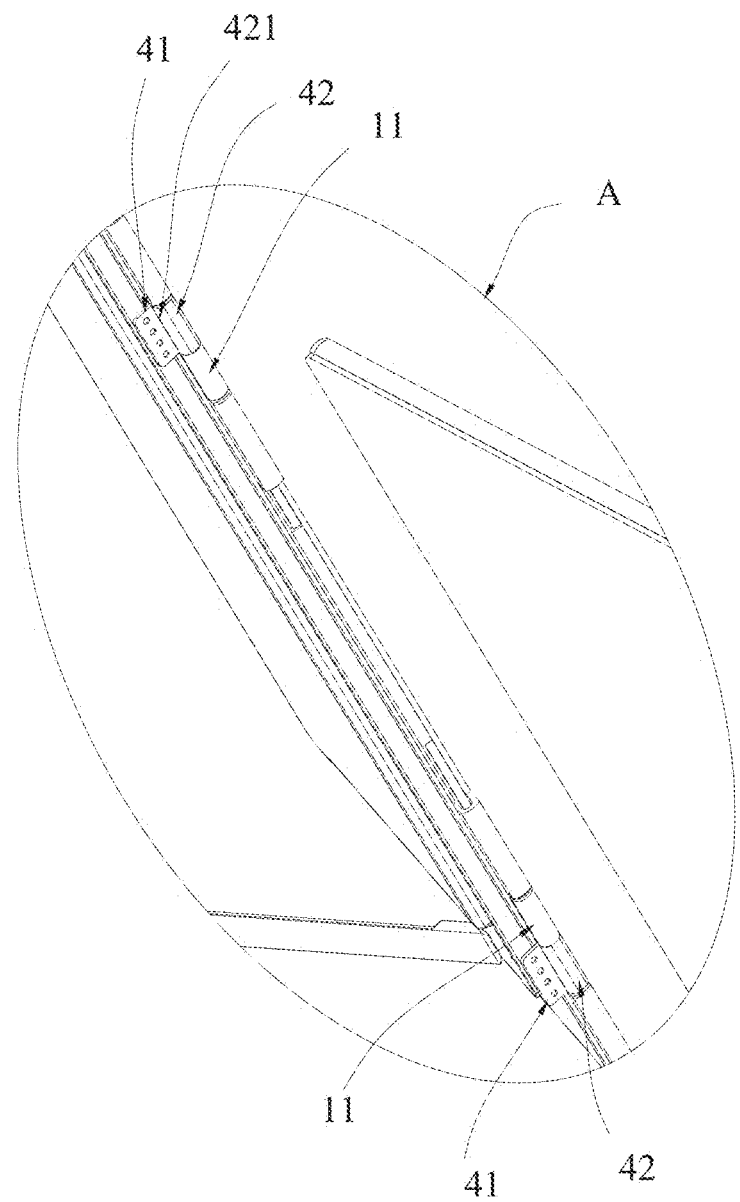
FIG. 3 is an enlarged view of area A in FIG. 2 according to the present invention.
Figure 4:
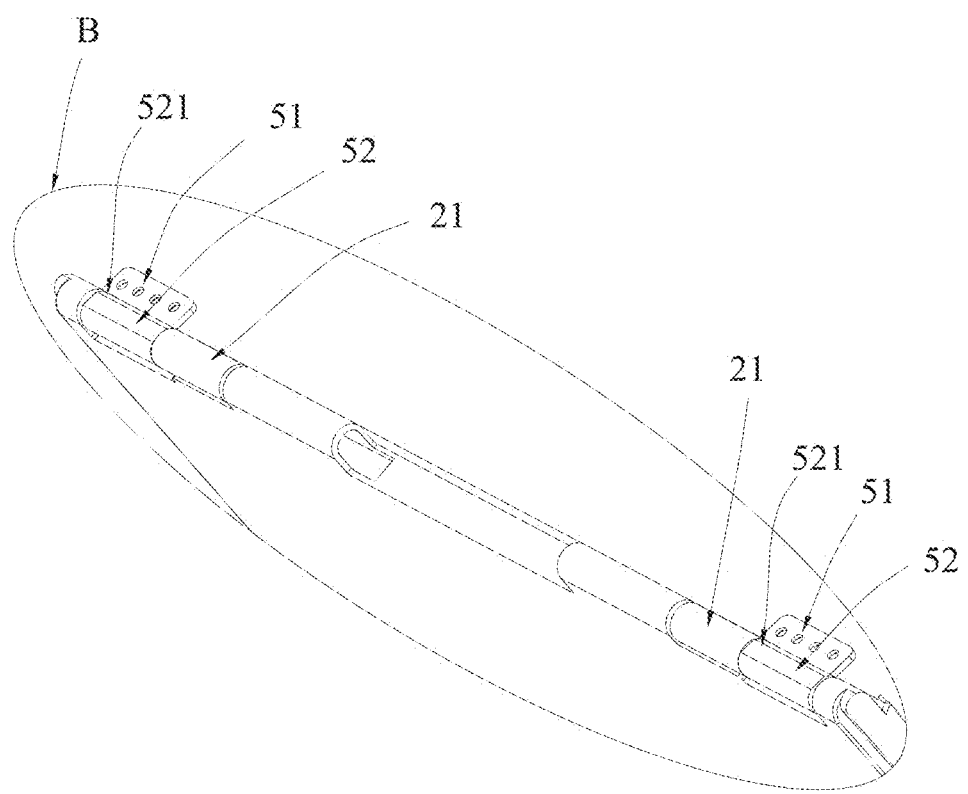
FIG. 4 is an enlarged view of area B in FIG. 2 according to the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Referring to FIGS. 1-13, an extended screen is provided. The extended screen includes a first display screen 1, a second display screen 2, and a third display screen 3. The second display screen 2 is connected to a top end 101 of the first display screen 1, and the third display screen 3 is connected to a left side edge 201 or a right side edge 2011 of the second display screen 2, so that the first display screen 1 and the third display screen 3 are capable of forming a diagonal shape. When the first display screen 1 and the third display screen 3 form a diagonal shape, one placement position 100 is formed below the third display screen 3 near the first display screen 1, as shown in FIG. 1. The placement position 100 is configured for placing a display screen 90 of a computer device 80 connected to the extended screen. That is to say, the extended screen includes three display screens, with two display screens arranged transversely above and one display screen arranged below, forming one placement position for placing a display screen 90 of a computer device 80. Therefore, four display screens are gathered to form a large display screen, which is more convenient for a user to view and use.

Figure 8:
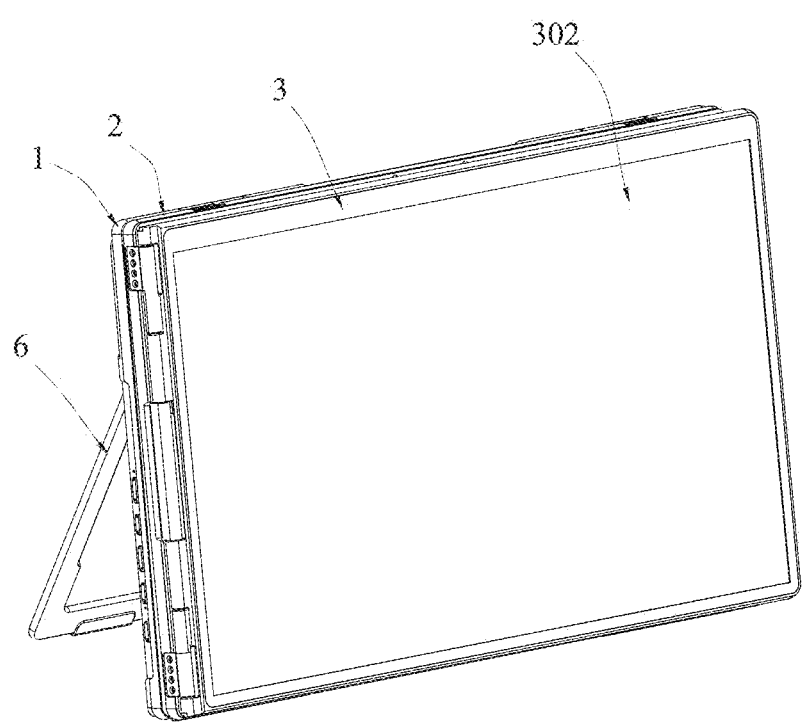
FIG. 8 is a perspective view of an extended screen using one screen according to the present invention.

In this embodiment, both the first display screen 1 and the third display screen 3 are rotatably connected to the second display screen 2, and the first display screen 1 and the third display screen 3 are capable of being rotated to be stacked on the second display screen 2, as shown in FIG. 8. That is, the extended screen is foldable for easy carrying and use by the user.

Figure 6:
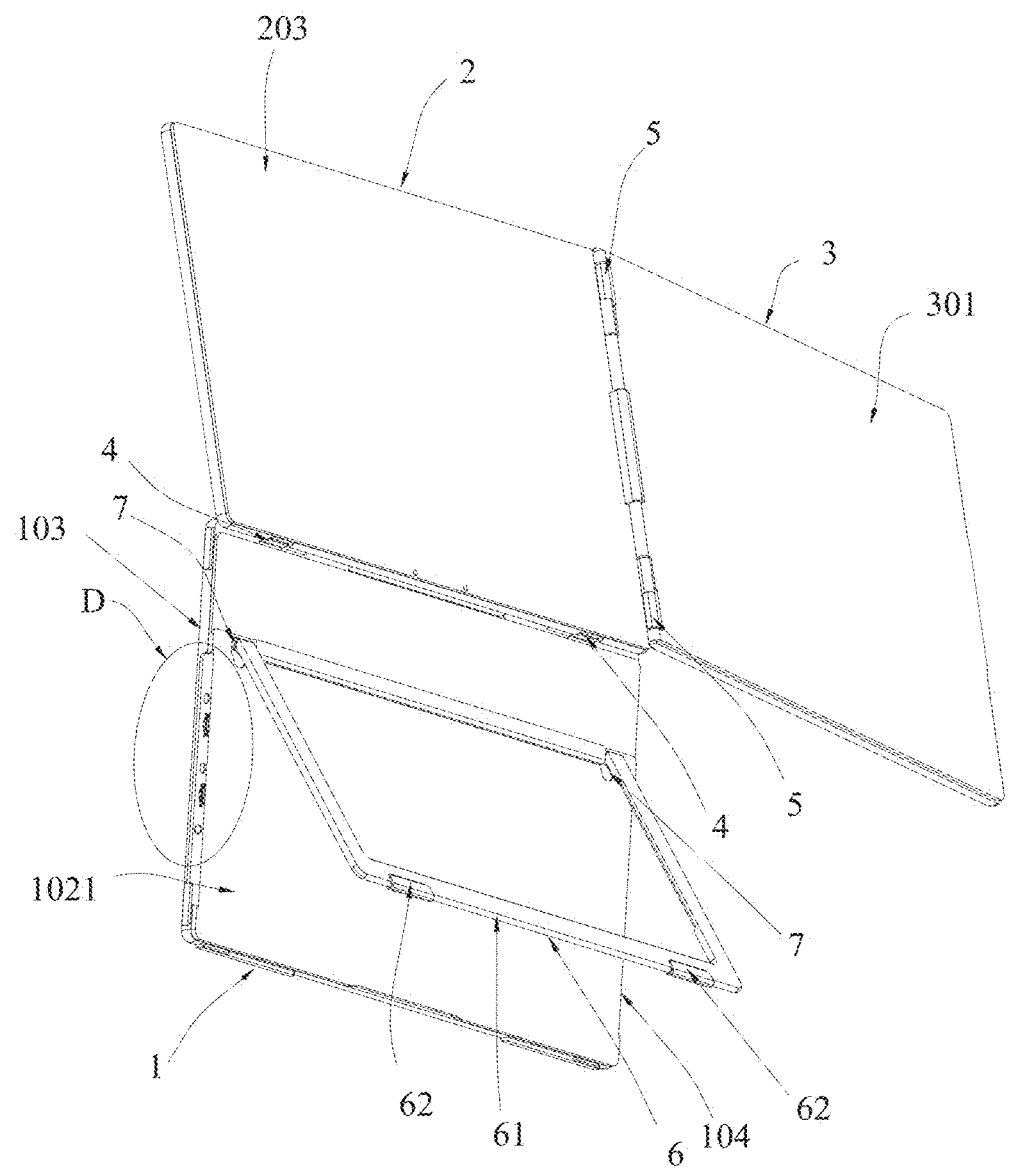
FIG. 6 is a perspective view of FIG. 1 from another angle of view according to the present invention.

In this embodiment, as shown in FIG. 6, the extended screen further includes first rotating connecting members 4. One end of the first rotating connecting member 4 is fixedly connected to the second display screen 2. The first rotating connecting member 4 is rotatably arranged at the top end 101 of the first display screen 1, and a display surface 102 of the first display screen 1 is capable of rotating to abut against a display surface 202 of the second display screen 2 through the rotation of the first rotating connecting member 4. The first display screen 1 is capable of rotating at least 180 degrees relative to the second display screen 2 through the first rotating connecting member 4. The structural arrangement is simple, which facilitates the assembly of the first display screen 1 and the second display screen, and facilitates the user to rotate the first display screen or the second display screen.

Figure 5:
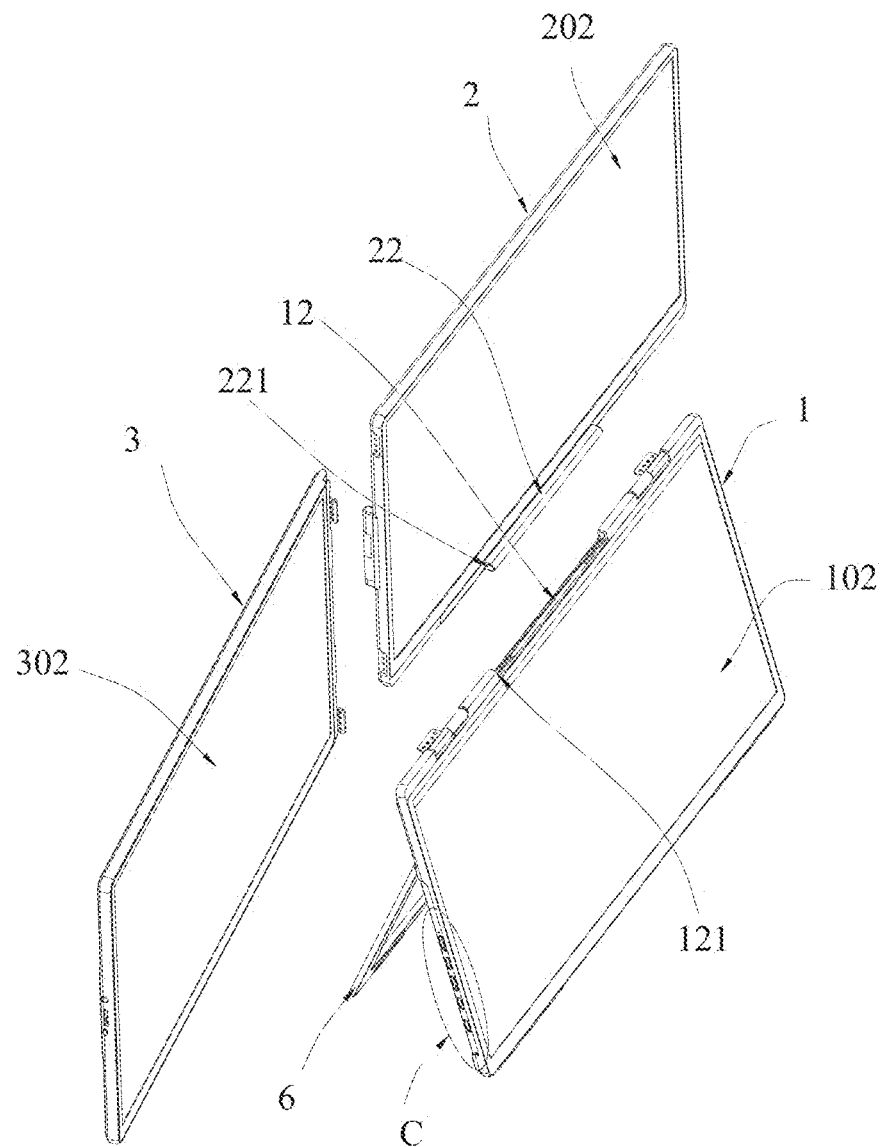
FIG. 5 is an exploded view of FIG. 2 from another angle of view according to the present invention.

In this embodiment, as shown in FIG. 5, the first rotating connecting member 4 includes a first connecting plate 41 and a first connecting shaft cylinder 42. The first connecting plate 41 is arranged on a side surface 421 of the first connecting shaft cylinder 42, and the first connecting shaft cylinder 42 is connected to a first connecting part 11 on the first display screen 1 through damping rotation. The first connecting plate 41 is fixedly connected to the second display screen 2 through a fixing member. Moreover, when the first display screen 1 is unfolded at a maximum angle relative to the second display screen 2, a side edge of the second display screen 2 connected to the first display screen 1 is positioned on a back surface of the first display screen 1. This structure makes the display surface of the first display screen and the display surface of the second display screen approximately seamlessly connected when the first display screen is unfolded relative to the second display screen, improving the user's viewing and usage experience.

In this embodiment, as shown in FIG. 5, an installation notch 12 is defined on a side edge of the first display screen 1 near the second display screen 2, and a cover plate 22 is provided on the display surface 202 of the second display screen 2 near the first display screen 1. When the first display screen 1 is connected to the second display screen 2, the cover plate 22 is arranged at the installation notch 12. One side wall of the installation notch 12 is provided with a first wire passing hole 121. One end of the cover plate 22 near the first wire passing hole 121 is provided with a second wire passing hole 221, and an inside of the cover plate 22 is in communication with an inside of the second display screen 2, so that wires can pass through the first wire passing hole and the second wire passing hole, facilitating electrical connection between the first display screen and the second display screen. Moreover, during the movement of the first display screen and the second display screen, this structural arrangement allows the wires to be hidden in the cover plate to move without damaging the wires, and also makes an overall appearance of the extended screen more tidy. In terms of display surfaces, the display surface of the first display screen and the display surface of the second display screen are tightly connected without gaps. Moreover, it is recommended that the installation notch be arranged in a middle portion of the side edge of the first display screen, and the first rotating connecting members be arranged on both sides of the notch, so that the rotation between the first display screen and the second display screen is more stable, and the wire connection between the first display screen and the second display screen is also more convenient. Sizes of the first wire passing hole and the second wire passing hole can be arranged according to a total number and a thickness of the wires passing through. The arrangement of wire passing between the second display screen and the third display screen is similar with that between the second display screen and the first display screen. A side edge of the third display screen near the second display screen is provided with an installation notch, and one side wall of the installation notch is provided with a wire passing hole. The back surface of the second display screen is provided with a cover plate, and one end of the cover plate is also provided with a wire passing hole. This structural design makes the overall appearance of the extended screen more neat. In terms of display surfaces, the display surface of the third display screen is closely connected to the display surface of the second display screen without gaps.

In this embodiment, as shown in FIG. 6, the extended screen further includes second rotating connecting members 5. One end of the second rotating connecting member 5 is fixedly connected to the third display screen 3. The second rotating connecting member 5 is rotatably arranged on the left side edge 201 or the right side edge 2011 of the second display screen 2, and a back surface 301 of the third display screen 3 is capable of being rotated to abut against the back surface 203 of the second display screen 2 through the rotation of the second rotating connecting member 5. The third display screen 3 is capable of rotating at least 180 degrees relative to the second display screen 2 through the second rotating connecting member 5. The structural arrangement is simple, which facilitates the assembly of the third display screen and the second display screen, and facilitates the user to rotate the third display screen or the second display screen.

In this embodiment, as shown in FIG. 5, the second rotating connecting member 5 includes a second connecting plate 51 and a second connecting shaft cylinder 52. The second connecting plate 51 is arranged on a side surface 521 of the second connecting shaft cylinder 52, and the second connecting shaft cylinder 52 is connected to a second connecting part 21 on the second display screen 2 through damping rotation. The second connecting plate 51 is fixedly connected to the third display screen 3 through a fixing member. Moreover, when the third display screen 3 is unfolded at a maximum angle relative to the second display screen 2, a side edge of the third display screen 3 connected to the second display screen 2 is positioned on the back surface 203 of the second display screen 2. This structure makes the display surface of the third display screen and the display surface of the second display screen approximately seamlessly connected when the third display screen is unfolded relative to the second display screen, improving the user's viewing and usage experience.

Figure 7:
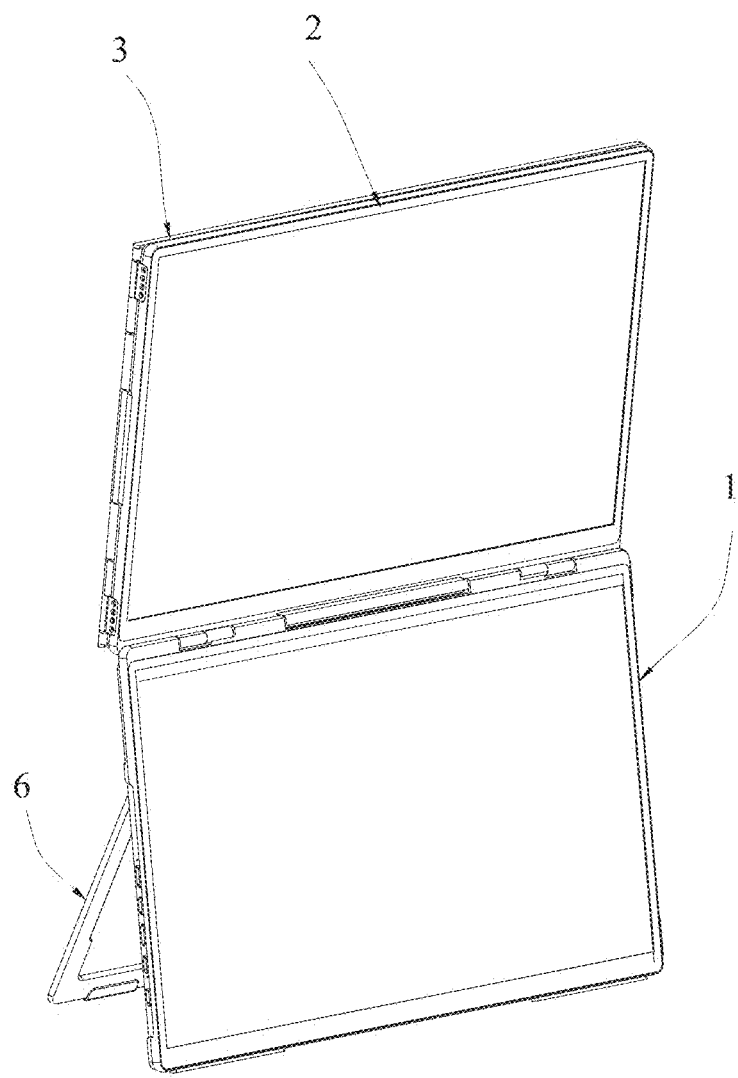
FIG. 7 is a perspective view of an extended screen with two screens unfolded according to the present invention.

That is to say, as shown in FIGS. 1, 8, and 7, the third display screen is capable of being folded onto the back surface of the second display screen, and the first display screen is capable of being folded on a front surface of the second display screen. When the first display screen and the third display screen are folded onto the second display screen at the same time, the extended screen forms a square shape, which is convenient for the user to carry. In this state, the extended screen can also be used, and the third display screen can be used alone for display, as shown in FIG. 8. The extended screen of this structure can use two screens to display, that is, the third display screen is folded onto the second display screen, as shown in FIG. 7, with only the first display screen and the second display screen unfolded. Moreover, three screens can also be used for display, that is, all the three display screens are unfolded, as shown in FIG. 1. The extended screen is versatile, making it easy for the user to choose and use according to the environment.

In this embodiment, as shown in FIG. 6, the extended screen further includes a support bracket 6. The support bracket 6 is rotatably arranged on the first display screen 1 to support the extended screen. However, it is not limited to arrange the support bracket only, and a suspension bracket can be arranged to hang on the display screen of the computer device. However, it is recommended that a small extended screen of this structure can be arranged to hang on the display screen of the computer device. If a large extended screen of this structure is hung on the display screen of the computer device, it is easy to damage the display screen of the computer device, and the display screen of the computer device cannot support the large extended screen. In this embodiment, the extended screen is mainly suitable for laptops, and a space of the placement position is mainly arranged according to length and width dimensions of the display screens of laptops on the market.

In this embodiment, as shown in FIG. 6, the extended screen further includes two third rotating connecting members 7. The support bracket 6 is a U-shaped support bracket, and the two third rotating connecting members 7 are rotatably arranged on a back surface 1021 of the first display screen 1. One of the third rotating connecting members 7 is arranged near a first side edge 103 of the first display screen 1, and an opposite one of the third rotating connecting members 7 is arranged near a second side edge 104 of the first display screen 1. The first side edge 103 of the first display screen 1 is opposite to the second side edge 104 of the first display screen 1, and two ends of the U-shaped support bracket are connected to the third rotating connecting members 7. The U-shaped support bracket has high support force, and is lightweight and also easy to assemble and arrange.

Figure 9:
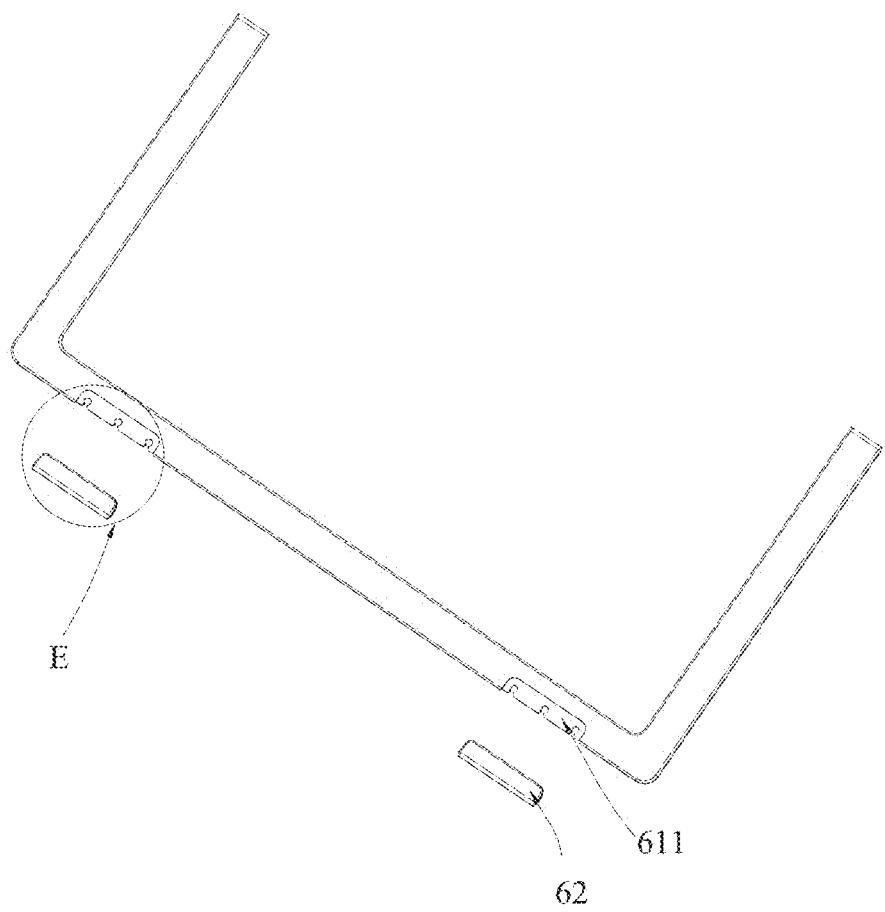
FIG. 9 is an exploded view of a support bracket according to the present invention.
Figure 10:
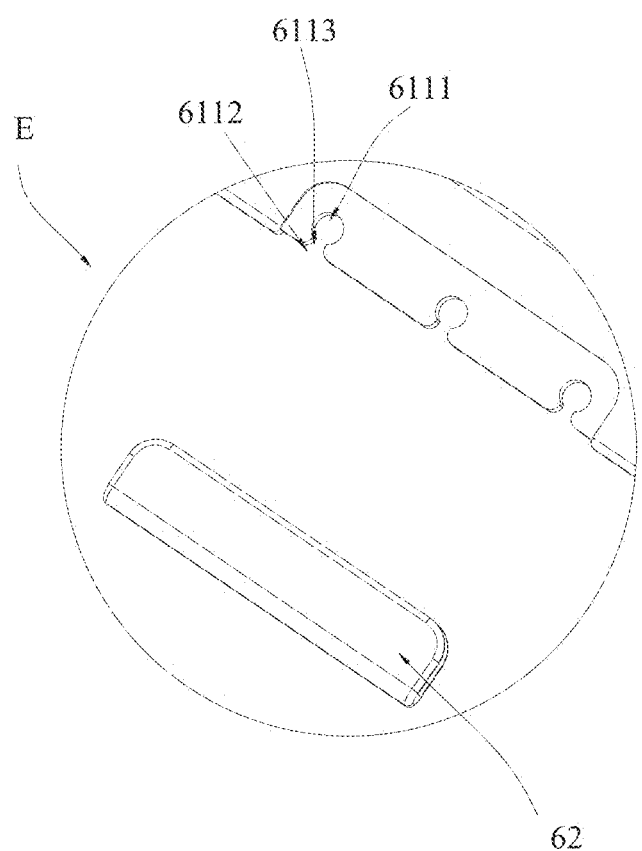
FIG. 10 is an enlarged view of area E in FIG. 9 according to the present invention.

In this embodiment, as shown in FIGS. 6, 9, and 10, a support cross bar 61 of the U-shaped support bracket is equipped with foot pads 62. The foot pads 62 are arranged to protect the support bracket from wear and tear, and the foot pads are generally made of micro elastic materials such as plastic, rubber, or silicone, which have friction and make the support bracket more stable during support.

In this embodiment, as shown in FIGS. 9 and 10, the support cross bar 61 of the U-shaped support bracket is provided with foot pad installation positions 611. The foot pad 62 is detachably installed at the foot pad installation position 611. When the foot pad 62 is installed at the foot pad installation position 611, an outer side surface of the foot pad 62 protrudes from an outer side surface of the support bracket 6. That is to say, the detachable foot pad is provided at a support end of the support bracket, and the outer side surface of the foot pad protrudes from the outer side surface of the support bracket, so that the foot pad is used for supporting to reduce the wear of the support end of the support bracket, thereby protecting the support end of the support bracket. Moreover, the foot pad is detachably installed on the support bracket, it is convenient for the user to replace the foot pad if the foot pad is worn.

Figure 11:
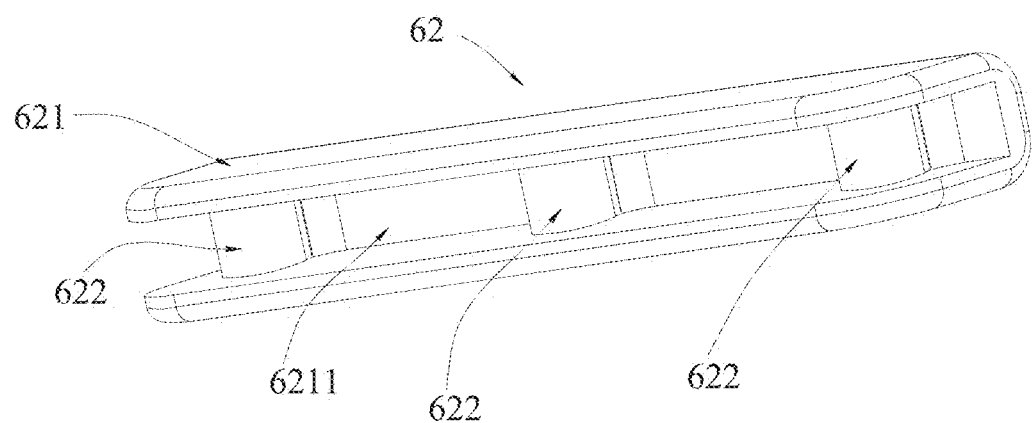
FIG. 11 is a perspective view of a foot pad according to the present invention.

In this embodiment, as shown in FIGS. 10 and 11, the foot pad installation position 611 is provided with clamping holes 6111 and openings 6112. The opening 6112 is defined in an outer side surface of the support cross bar 61, and the clamping hole 6111 is in communication with the opening 6112. The foot pad 62 includes a housing 621 and clamping columns 622. The housing 621 includes one U-shaped installation groove 6211. The housing 621 is capable of being inserted into the foot pad installation position 611 through the U-shaped installation groove 6211. The clamping column 622 is longitudinally arranged in the U-shaped installation groove 6211, and the clamping column 622 is capable of passing through the opening 6112 to be clamped into the clamping hole 6111, so that the foot pad is stably installed at the foot pad installation position 611. Through the structural setting of the foot pad 62 and the structural setting of the clamping hole 6111 and the opening 6112, for the factory, the clamping hole 6111 and the opening 6112 can be demolded together when the support bracket is demolded, which saves the process; the housing 621 and the clamping column 622 are preferably integrally formed, which is also convenient for demolding, and the installation process of the foot pad is simple and easy for the user to install and remove.

In this embodiment, as shown in FIG. 10, a connecting through-hole 6113 is defined between the opening 6112 and the clamping hole 6111. A transverse diameter of the connecting through-hole 6113 is smaller than a transverse diameter of the clamping hole 6111 and a transverse diameter of the opening 6112. The setting of the connecting through-hole 6113 is more convenient for the user to install the foot pad and also makes the installation of the foot pad more stable.

In this embodiment, as shown in FIG. 10, two side surfaces of the connecting through-hole 6113 are arc-shaped surfaces, which is equivalent to the connecting through-hole 6113 being a transition section, making installation easier and more labor-saving for the user.

In this embodiment, as shown in FIG. 11, the foot pad installation position is provided with three of the clamping holes 6111 and three of the openings 6112, and the foot pad is provided with three of the clamping columns 622. When the foot pad has a certain length, the stability of supporting the extended screen is higher.

Figure 12:
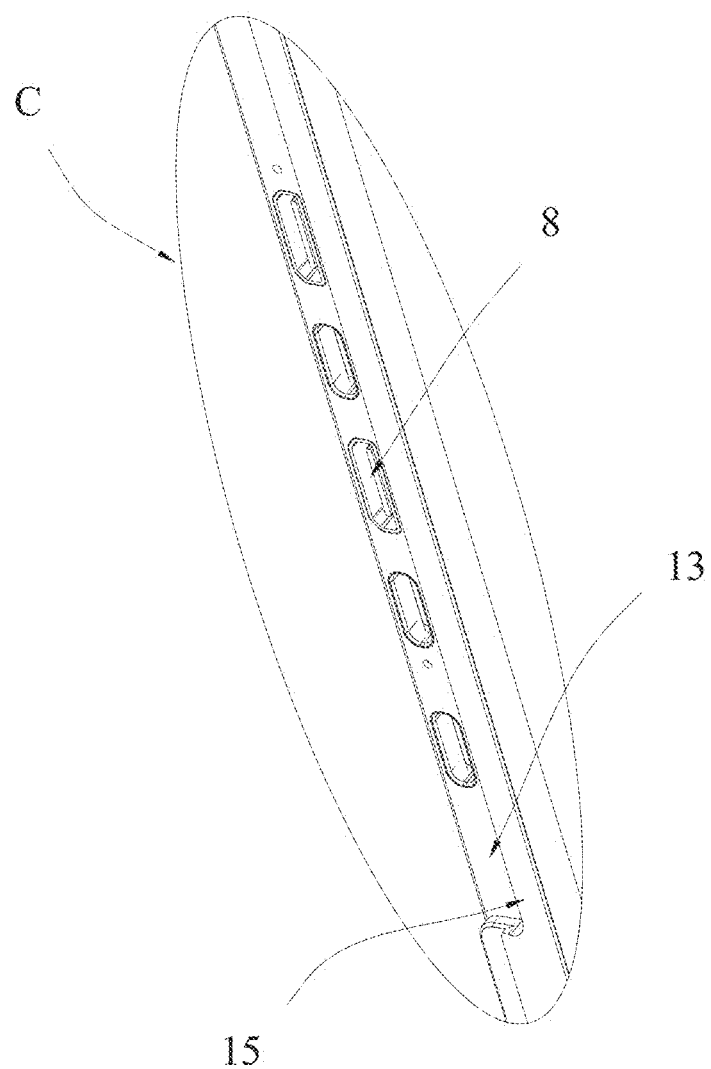
FIG. 12 is an enlarged view of area C in FIG. 5 according to the present invention.

In this embodiment, as shown in FIG. 12, the extended screen further includes a connecting interface 8. A first groove 13 is defined in a side edge of the first display screen 1, the second display screen 2, or the third display screen 3. The connecting interface 8 is provided inside the first groove 13, making the overall appearance of the extended screen more beautiful and has a sense of design.

In this embodiment, it is preferred to arrange the connecting interface 8 on a side edge of the first display screen 1 near the third display screen 3, which facilitates the connection between the extended screen and the computer device for the user, and is more convenient for the user to use.

In this embodiment, as shown in FIG. 11, a first blocking plate 15 is provided on one side of the first groove 13 near the display surface 102 of the first display screen 1, the display surface 202 of the second display screen 2, or a display surface 302 of the third display screen 3. The first blocking plate 15 is arranged along a length of the first groove 13 to protect a connector end of a data connection cable, so that the data connection cable is not easily accidentally knocked off during use by the user, and the overall appearance of the extended screen is more beautiful. Moreover, the first blocking plate 15 is arrange along the length of the first groove 13, which facilitates the installation of the screen on the display surface. The screen does not need to be provided with a notch, and the first blocking plate is integrally formed with a display screen main body, saving processes and making the first blocking plate more stable.

Figure 13:
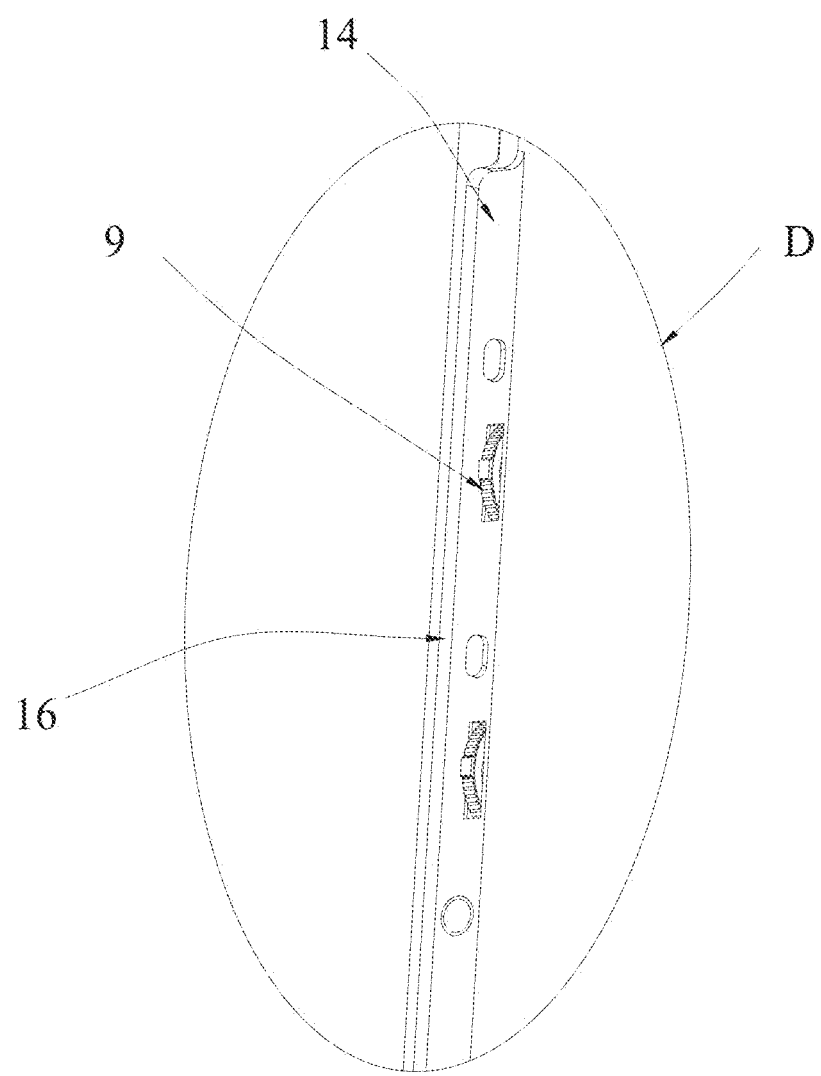
FIG. 13 is an enlarged view of area D in FIG. 6 according to the present invention.

In this embodiment, as shown in FIG. 13, a second blocking plate 16 is provided on one side of a second groove 14 near the display surface 102 of the first display screen 1, the display surface 202 of the second display screen 2, or the display surface 302 of the third display screen 3. The second blocking plate 16 is arranged along a length of the second groove 14, and a top end of a display screen control key 9 does not exceed an outermost side edge of the second blocking plate 16, so that the key can be protected from being damaged by accidental touch, or an image of the extended screen can be prevented from being adjusted due to accidental touch, thereby enhancing the stability of the use of the extended screen.

In this embodiment, the connecting interface 8 includes a Type-C interface and a Type-A interface.

In this embodiment, the extended screen further includes a display screen control key 9. A second groove 14 is defined in a side edge of the first display screen 1, the second display screen 2, or the third display screen 3. The second groove 14 is defined in an opposite side edge of the side edge in which the first groove 13 is defined. The display screen control key 9 is provided in the second groove 14. The arrangement of the second groove 14 protects the display screen control key, making the display screen control key less likely to be bumped, preventing the user from suffering losses, and improving user experience. Moreover, the second groove 14 is provided opposite to the first groove 13, which is convenient for the user to use and adds a sense of design to the overall appearance of the extended screen.

Overall, the folding design of three screens is more convenient for the user to use and carry, and the structure is simple and easy to assemble. The overall design is easy for the user to use safely and stably, and enhances the overall user experience.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. An extended screen, comprising:
    a first display screen;
    a second display screen; and
    a third display screen, wherein the first display screen, the second display screen and the third display screen are arranged in a manner that the second display screen is connected to a top end of the first display screen, and the third display screen is connected to a left side edge or a right side edge of the second display screen, so that the first display screen and the third display screen are capable of forming a diagonal shape; when the first display screen and the third display screen form the diagonal shape, one placement position is formed below the third display screen adjacent to the first display screen; and the one placement position is configured for placing a display screen of a computer device, and the first display screen and the third display screen are configured to be spatially separated from the display screen of the computer device; and wherein both the first display screen and the third display screen are rotatably connected to the second display screen, and the first display screen and the third display screen are capable of being rotated to be stacked on the second display screen.

2. The extended screen according to claim 1, wherein the extended screen further comprises first rotating connecting members; one end of the first rotating connecting member is fixedly connected to the second display screen; the first rotating connecting member is rotatably arranged at the top end of the first display screen; a display surface of the first display screen is capable of rotating to abut against a display surface of the second display screen through the rotation of the first rotating connecting member; and the first display screen is capable of rotating at least 180 degrees relative to the second display screen through the first rotating connecting member.

3. The extended screen according to claim 2, wherein the first rotating connecting member comprises a first connecting plate and a first connecting shaft cylinder; the first connecting plate is arranged on a side surface of the first connecting shaft cylinder; the first connecting shaft cylinder is connected to a first connecting part on the first display screen through damping rotation; the first connecting plate is fixedly connected to the second display screen; and when the first display screen is unfolded at a maximum angle relative to the second display screen, a bottom side edge of the second display screen connected to the first display screen is positioned on a back surface of the first display screen.

4. The extended screen according to claim 2, wherein an installation notch is defined on a side edge of the first display screen near the second display screen; a cover plate is provided on the display surface of the second display screen near the first display screen; when the first display screen is connected to the second display screen, the cover plate is arranged at the installation notch; one side wall of the installation notch is provided with a first wire passing hole; one end of the cover plate near the first wire passing hole is provided with a second wire passing hole; and an inside of the cover plate is in communication with an inside of the second display screen.

5. The extended screen according to claim 1, wherein the extended screen further comprises second rotating connecting members; one end of the second rotating connecting member is fixedly connected to the third display screen; the second rotating connecting member is rotatably arranged on the left side edge or the right side edge of the second display screen; a back surface of the third display screen is capable of being rotated to abut against the back surface of the second display screen through the rotation of the second rotating connecting member; and the third display screen is capable of rotating at least 180 degrees relative to the second display screen through the second rotating connecting member.

6. The extended screen according to claim 5, wherein the second rotating connecting member comprises a second connecting plate and a second connecting shaft cylinder; the second connecting plate is arranged on a side surface of the second connecting shaft cylinder; the second connecting shaft cylinder is connected to a second connecting part on the second display screen through damping rotation; the second connecting plate is fixedly connected to the third display screen; and when the third display screen is unfolded at a maximum angle relative to the second display screen, a side edge of the third display screen connected to the second display screen is positioned on the back surface of the second display screen.

7. The extended screen according to claim 1, wherein the extended screen further comprises a support bracket, and the support bracket is rotatably arranged on the first display screen.

8. The extended screen according to claim 7, wherein the extended screen further comprises two third rotating connecting members; the support bracket is a U-shaped support bracket; the two third rotating connecting members are rotatably arranged on a back surface of the first display screen; one of the third rotating connecting members is arranged near a first side edge of the first display screen, and an opposite one of the third rotating connecting members is arranged near a second side edge of the first display screen; the first side edge of the first display screen is opposite to the second side edge of the first display screen; and two ends of the U-shaped support bracket are connected to the third rotating connecting members.

9. The extended screen according to claim 8, wherein a support cross bar of the U-shaped support bracket is equipped with foot pads, and the support cross bar of the U-shaped support bracket is provided with foot pad installation positions corresponding to the foot pads; each of the foot pads is detachably installed at the corresponding foot pad installation position; and when each of the foot pads is installed at the corresponding foot pad installation position, an outer side surface of each of the foot pads protrudes from an outer side surface of the support bracket.

10. The extended screen according to claim 9, wherein each of the foot pad installation positions is provided with clamping holes and openings; each of the openings is defined in an outer side surface of the support cross bar; each of the clamping holes is in communication with the opening; each of the foot pads comprises a housing and clamping columns; the housing comprises one U-shaped installation groove; the housing is capable of being inserted into the foot pad installation position through the U-shaped installation groove; each of the clamping columns is longitudinally arranged in the U-shaped installation groove; and each of the clamping columns is capable of passing through the opening to be clamped into the clamping hole.

11. The extended screen according to claim 10, wherein a connecting through-hole is defined between the opening and the clamping hole; a transverse width of the connecting through hole is smaller than a transverse diameter of the clamping hole and a transverse width of the opening.

12. The extended screen according to claim 11, wherein two side surfaces of the connecting through-hole are arc-shaped surfaces, and each of the foot pads installation position is provided with three of the clamping holes and three of the openings, and each of the foot pads is provided with three of the clamping columns.

13. The extended screen according to claim 1, wherein the extended screen further comprises a connecting interface; a first groove is defined in a side edge of the first display screen, the second display screen, or the third display screen; and the connecting interface is provided inside the first groove.

14. The extended screen according to claim 13, wherein the connecting interface is arranged on the side edge of the first display screen near the third display screen.

15. The extended screen according to claim 13, wherein a first blocking plate is provided on one side of the first groove near the display surface of the first display screen, the display surface of the second display screen, or a display surface of the third display screen; and the first blocking plate is arranged along a length of the first groove.

16. The extended screen according to claim 13, wherein the extended screen further comprises a display screen control key; a second groove is defined in the side edge of the first display screen, the second display screen, or the third display screen; the second groove is defined in an opposite side edge of the side edge in which the first groove is defined; and the display screen control key is provided in the second groove.

17. The extended screen according to claim 16, wherein a second blocking plate is provided on one side of the second groove near the display surface of the first display screen, the display surface of the second display screen, or the display surface of the third display screen; the second blocking plate is arranged along a length of the second groove; and a top end of the display screen control key does not exceed an outermost side edge of the second blocking plate.

18. A system, comprising:
a computer device having a fourth display screen; and an extended screen capable of being electrically connected to the computer device and spatially separated from the computer device, the extended screen comprising:

a first display screen;

a second display screen; and a third display screen, wherein the first display screen, the second display screen and the third display screen are arranged in a manner that the second display screen is connected to a top end of the first display screen, and the third display screen is connected to a left side edge or a right side edge of the second display screen, so that the first display screen and the third display screen are capable of forming a diagonal shape; when the first display screen and the third display screen form the diagonal shape, a placement position is formed below the third display screen adjacent to the first display screen; and the placement position is configured for placing the fourth display screen of the computer device, and the first display screen and the third display screen are spatially separated from the fourth display screen of the computer device; and wherein both the first display screen and the third display screen are rotatably connected to the second display screen, and the first display screen and the third display screen are capable of being rotated to be stacked on the second display screen.

19. The system according to claim 16, wherein the extended screen further comprises a support bracket, and the support bracket is rotatably arranged on the first display screen, the support bracket is a U-shaped support bracket, a support cross bar of the U-shaped support bracket is provided with a plurality of foot pad installation positions and a plurality of foot pads, and each of the foot pads is detachably installed at the corresponding foot pad installation position;

wherein each of the foot pad installation positions is provided with clamping holes and openings; each of the openings is defined in an outer side surface of the support cross bar; each of the clamping holes is in communication with the opening; each of the foot pads comprises a housing and clamping columns; the housing comprises one U-shaped installation groove; the housing is capable of being inserted into the foot pad installation position through the U-shaped installation groove; each of the clamping columns is longitudinally arranged in the U-shaped installation groove; and each of the clamping columns is capable of passing through the opening to be clamped into the clamping hole.

* * * * *